United States Patent
Mayer-Patel et al.

(10) Patent No.: US 11,212,531 B2
(45) Date of Patent: Dec. 28, 2021

(54) METHODS, SYSTEMS, AND COMPUTER READABLE MEDIA FOR DECODING VIDEO USING RATE SORTED ENTROPY CODING

(71) Applicant: The University of North Carolina at Chapel Hill, Chapel Hill, NC (US)

(72) Inventors: Ketan Dasharath Mayer-Patel, Durham, NC (US); Aaron Joseph Smith, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 15 days.

(21) Appl. No.: 16/893,406

(22) Filed: Jun. 4, 2020

(65) Prior Publication Data

US 2020/0389647 A1   Dec. 10, 2020

Related U.S. Application Data

(60) Provisional application No. 62/858,486, filed on Jun. 7, 2019.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/13* | (2014.01) |
| *H04N 19/146* | (2014.01) |

(52) U.S. Cl.
CPC ........... *H04N 19/13* (2014.11); *H04N 19/146* (2014.11)

(58) Field of Classification Search
CPC ....... H04N 19/13; H04N 19/146; H04N 19/91
See application file for complete search history.

(56) References Cited

U.S. PATENT DOCUMENTS

| | | | |
|---|---|---|---|
| 7,176,815 B1 * | 2/2007 | Hung | H03M 7/4006 341/107 |
| 7,262,721 B2 * | 8/2007 | Jeon | H04N 19/176 341/107 |
| 9,992,496 B1 * | 6/2018 | Maaninen | H04N 19/124 |

(Continued)

OTHER PUBLICATIONS

"X265 HEVC Encoder/H.265 Video Codec," http://x265.org/, pp. 1-4 (Jun. 2020).

(Continued)

*Primary Examiner* — Fabio S Lima
(74) *Attorney, Agent, or Firm* — Jenkins, Wilson, Taylor & Hunt, P.A.

(57) ABSTRACT

According to one method, a method for decoding data using rate sorted entropy coding occurs at a video decoder implemented using at least one processor. The method comprises: receiving rate control information associated with a first bitstream; determining, using the rate control information, a maximum amount of bits available for a next symbol in the first bitstream; determining, using a symbol probability model and a first deterministic algorithm, an amount of bits for a least probable value of the next symbol; and determining that the next symbol is included in the first bitstream if the amount of bits for the least probable value of the next symbol is less than or equal to the maximum amount of bits available for the first bitstream.

20 Claims, 11 Drawing Sheets

(56) References Cited

U.S. PATENT DOCUMENTS

| | | | | |
|---|---|---|---|---|
| 2006/0165190 | A1* | 7/2006 | Tamaki | H04L 1/1671 375/262 |
| 2012/0219057 | A1* | 8/2012 | Takahashi | H04N 19/124 375/240.03 |
| 2014/0210652 | A1* | 7/2014 | Bartnik | H04N 19/436 341/67 |

OTHER PUBLICATIONS

Praeter et al., "Video Encoder Architecture for Low-Delay Live-Streaming Events," IEEE Transactions on Multimedia, vol. 19, No. 10, pp. 2252-2266 (Oct. 2017).
Wang et al., "Efficient Coding Tree Unit (CTU) Decision Method for Scalable High-Efficiency Video Coding (SHVC) Encoder," Recent Advances in Image and Video Coding, Chaper 11, pp. 247-264 (2016).
Boyce et al., "Overview of SHVC: Scalable Extensions of the High Efficiency Video Coding Standard," IEEE Transactions on Circuits and Systems for Video Technology, vol. 26, No. 1, pp. 20-34 (Jan. 2016).
Sole et al., "Transform Coefficient Coding in HEVC," IEEE Transactions on Circuits and Systems for Video Technology, pp. 1-12 (2012).
Sullivan et al., "Overview of the High Efficiency Video Coding (HEVC) Standard," IEEE Transactions on Circuits and Systems for Video Technology, vol. 22, No. 12, pp. 1649-1668 (Dec. 2012).
Amon et al., "Scalable Video Coding and Transcoding," 2008 IEEE International Conference on Automation, Quality and Testing Robotics, vol. 1, pp. 1-6 (2008).
Schwarz et al., "Overview of the Scalable Video Coding Extension of the H.264/AVC Standard," IEEE Transactions on Circuits and Systems for Video Technology, vol. 17, No. 9, pp. 1103-1120 (Sep. 2007).
Benyaminovich et al., "Optimal Transrating via DCT Coefficients Modification and Dropping," ITRE 2005 3rd International Conference on Information Technology: Research and Education, pp. 1-5 (2005).
Ohm, "Advances in Scalable Video Coding," Proceedings of the IEEE, vol. 93, No. 1. pp. 42-56 (Jan. 2005).
Wiegand et al., "Overview of the H.264/AVC Video Coding Standard," IEEE Transactions on Circuits and Systems for Video Technology, vol. 13, No. 7, pp. 560-576 (Jul. 2003).
Van der Schaar et al., "Adaptive Motion-Compensation Fine-Granular-Scalability (AMC-FGS) for Wireless Video," IEEE Transactions on Circuits and Systems for Video Technology, vol. 12, No. 6, pp. 360-371 (Jun. 2002).
Mayer et al., "Bit plane quantization for scalable video coding," Proceedings of Spie, Visual Communications and Imagine Processing, pp. 1-12 (Jan. 2002).
Rose et al., "Toward Optimality in Scalable Predictive Coding," IEEE Transactions on Image Processing, vol. 10, No. 7, pp. 965-976 (Jul. 2001).
Li, "Overview of Fine Granularity Scalability in MPEG-4 Video Standard," IEEE Transactions on Circuits and Systems for Video Technology, vol. 11, No. 3, pp. 301-317 (Mar. 2001).
Van der Schaar et al., "A Hybrid Temporal-SNR Fine-Granular Scalability for Internet Video," IEEE Transactions on Circuits and Systems for Video Technology, vol. 11, No. 3, pp. 318-331 (Mar. 2001).
Wu et al., "A Framework for Efficient Progressive Fine Granularity Scalable Video Coding," IEEE Transactions on Circuits and Systems for Video Technology, vol. 11, No. 3, pp. 332-344 (Mar. 2001).
"Arithmetic coding," Wikipedia, https://en.wikipedia.org/w/index.php?title=Arithmetic_coding&oldid=890278905, pp. 1-11 (Mar. 31, 2019).

* cited by examiner

METHODS, SYSTEMS, AND COMPUTER READABLE MEDIA FOR DECODING VIDEO USING RATE SORTED ENTROPY CODING

CROSS-REFERENCE TO RELATED APPLICATION

This application relates to and claims priority to U.S. Provisional Patent Application Ser. No. 62/858,486 filed Jun. 7, 2019, the disclosure of which is incorporated by reference herein in the entirety.

TECHNICAL FIELD

The subject matter described herein relates to data processing. More specifically, the subject matter relates to methods, systems, and computer readable media for using rate sorted entropy coding.

BACKGROUND

Techniques for scalable video coding have been suggested, studied, and standardized by video coding groups. Recently, the scalable extension (SHVC) of the state-of-the-art high efficiency video coding (HEVC) standard allows scalability along the dimensions of signal-to-noise ratio (SNR), pixel resolution, frame rate, color gamut, and dynamic range/intensity bit depth. Scalable video codings can provide flexibility for decoders to dynamically select from multiple available configurations according to available resources or application-level goals. Adaptation via scalable coding can improve the quality of a user's experience for applications ranging from interactive real-time video conferencing to on-demand streaming of prerecorded video content.

Despite these benefits, however, scalable coding techniques have seen little traction in terms of practical use. Industry-level adoption of these techniques is scarce, in part due to the implementation complexity to support scalable solutions, the increased computational resources required, and the desire for maximal compatibility with decoding devices. Ultimately, scalable encoders may only see widespread use if the benefits of their integration outweigh the burden of their implementation.

Accordingly, there exists a need for improved methods, systems, and computer readable media for using rate sorted entropy coding.

SUMMARY

Methods, systems, and computer readable media for using rate sorted entropy coding are disclosed. According to one method, a method for decoding data using rate sorted entropy coding occurs at a video decoder implemented using at least one processor. The method comprises: receiving rate control information associated with a first bitstream; determining, using the rate control information, a maximum amount of bits available for a next symbol in the first bitstream; determining, using a symbol probability model and a first deterministic algorithm, an amount of bits for a least probable value of the next symbol; and determining that the next symbol is included in the first bitstream if the amount of bits for the least probable value of the next symbol is less than or equal to the maximum amount of bits available for the first bitstream and determining that the next symbol is not included in the first bitstream if the amount of bits for the least probable value of the next symbol is greater than the maximum amount of bits available for the first bitstream.

According to one system, a system for decoding data using rate sorted entropy coding includes at least one processor and a video decoder implemented using at least one processor. The video decoder is configured for: receiving rate control information associated with a first bitstream; determining, using the rate control information, a maximum amount of bits available for a next symbol in the first bitstream; determining, using a symbol probability model and a first deterministic algorithm, an amount of bits for a least probable value of the next symbol; and determining that the next symbol is included in the first bitstream if the amount of bits for the least probable value of the next symbol is less than or equal to the maximum amount of bits available for the first bitstream and determining that the next symbol is not included in the first bitstream if the amount of bits for the least probable value of the next symbol is greater than the maximum amount of bits available for the first bitstream.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer cause the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, each of the terms "node" and "host" refers to a physical computing platform or device including one or more processors and memory.

As used herein, the term "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
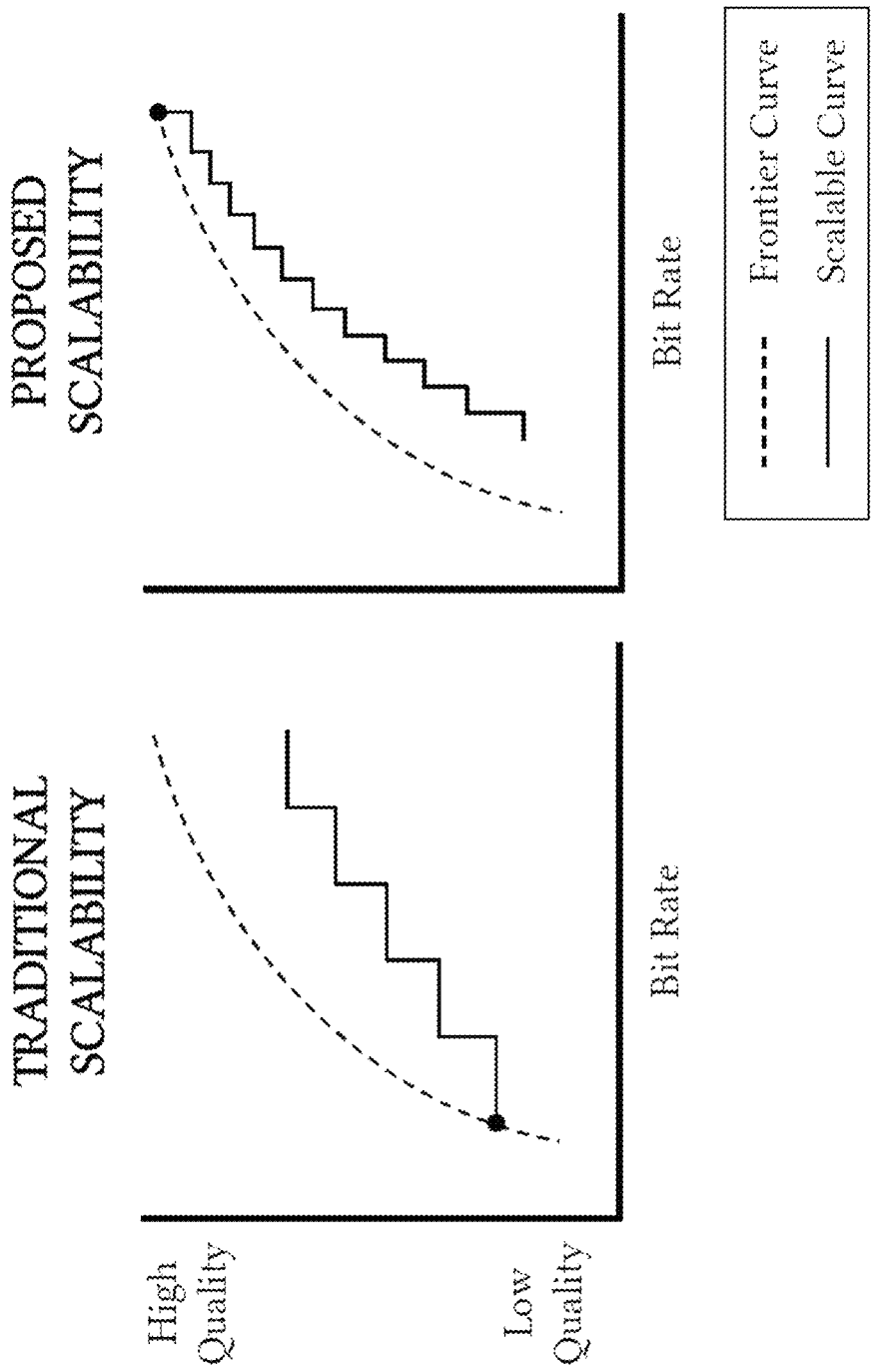
FIG. 1 depicts proposed scalability for an example implementation of rate sorted entropy coding.

The subject matter described herein relates to methods, systems, and computer readable media for using rate sorted entropy coding. The subject matter described herein discloses example techniques, methods, systems, and/or devices for performing rate sorted entropy coding and/or related aspects thereof.

Arithmetic coding is a type of entropy coding commonly used for data compression and in particular in video coding. An example method described herein uses a rate controller to sort arithmetically encoded symbols into layers (e.g., bitstreams) for transmission. The rate controller determines an effective "peak available entropy" which is compared to the potential entropy required to encode the least probable symbol value at the time a particular symbol is being considered for transmission in a particular layer. If peak available entropy is insufficient to encode the least probable symbol (regardless of the actual symbol to be encoded), the symbol is not encoded at this layer and is instead considered for transmission at the next highest layer. A synchronized rate control process at the receiver uses the same process in lock step to anticipate whether the symbol will be encoded at this layer or not. The result of this process is a set of independent layers into which arithmetically encoded symbols are sorted such that the receiver can selectively subscribe to an ordered subset of layers in order to receive an approximation of the encoded data proportional to the number of layers received. In other words, if the receiver subscribes to all of the layers, it will receive all of the information and recover the original symbol stream without error and if the receiver subscribes to fewer than all of the layers, the receiver will recover, without error, any symbols sorted into the lower layers to which it is subscribed and will recover, approximately (e.g., possibly with error), any symbols sorted into higher layers to which it has not subscribed.

One novel feature of this scheme is that it can be applied to existing standardized video compression schemes that rely on arithmetic encoding without having to fully decode and re-encode (i.e., transcode) the original stream making it a computationally efficient manner for adapting a high quality, high bandwidth video stream into a lower quality, lower bandwidth stream. Applications include video streaming on demand, distributed video archiving, and other distributed multimedia applications that make use of video adaptation.

1 Introduction

Techniques for scalable video coding have been suggested, studied, and standardized by video coding groups for decades [8, 10]. Most recently, the scalable extension (SHVC) of the state-of-the-art High Efficiency Video Coding (HEVC) standard allows scalability along the dimensions of signal-to-noise ratio (SNR), pixel resolution, frame rate, color gamut, and dynamic range/intensity bit depth [3].

Scalable video codings can provide flexibility for decoders to dynamically select from multiple available configurations according to available resources or application-level goals. Adaptation via scalable coding can improve the quality of a user's experience for applications ranging from interactive real-time video conferencing to on-demand streaming of prerecorded video content [13].

Despite these benefits, however, scalable coding techniques have seen little traction in terms of practical use [3]. Industry-level adoption of these techniques is scarce, in part due to the implementation complexity to support scalable solutions, the increased computational resources required, and the desire for maximal compatibility with decoding devices. Ultimately, scalable encoders may only see widespread use if the benefits of their integration outweigh the burden of their implementation.

The most common structure for modern scalable video encoding systems is to produce a backwards-compatible standard-compliant base layer bitstream along with a series of enhancement layers [3, 15]. In this paradigm, the base layer bitstream is a complete low-quality version of the video that is fully decodable by a non-scalable decoder. To recover a higher-quality version of the video, a decoder uses one or more enhancement layers to refine and improve the base-level reproduction. This structure is employed by SHVC as well as its predecessor SVC [3, 10].

The base/enhancement layer structure used by virtually all modern scalable video proposals induces an inverse relationship between reproduction quality and coding efficiency, anchored at the base layer. In other words, decoding the base layer alone provides the highest coding efficiency and the lowest quality reproduction, while coding efficiency decreases as more enhancement layers are used. As a fully compliant non-scalable representation, the base layer lies on the theoretically optimal rate-distortion frontier offered by the encoding algorithm. In contrast, the additional enhancement layers cannot maintain this optimal coding efficiency for higher bit rates. This is due to the fact that the presence of enhancement data when predicting future frames is not guaranteed to be available to a decoder. Thus, coding efficiency decreases as reproduction quality increases. FIG. 1 depicts proposed scalability for an example implementation of rate sorted entropy coding. Note that the scalable curve (solid) is anchored at the base layer and intersects the frontier curve (dashed) only at this point. The area between the scalable curve and the frontier curve depicts the inefficiency incurred by introducing scalability in the scheme.

We assert that the inverse relationship between quality and efficiency demonstrated above prevents practical systems from taking advantage of scalable representations. As network infrastructure continues to improve and video playback devices with increased computing capabilities become more common, we can expect high quality video delivery to be the more common use case with adaptation toward lower quality representations considered an exceptional, albeit important, condition. Existing solutions to scalability, which are most efficient for low-quality video, are therefore optimizing for a situation that is becoming less prevalent. What is required is a shift in perspective and to consider an initial high-quality representation as our starting point. That representation of the highest quality endpoint along our adaptation range is where our scalability mechanisms should be anchored as close as possible to the optimal rate-distortion frontier. Adaptation to the other end of the quality spectrum can then be created as derived subsets of the information encoded at the top.

We assert that the field of scalable video coding is ripe for a fundamental paradigm shift in which scalability is no longer viewed as an enhancement process from low quality to high quality, but understood instead as an adaptive degradation process from high quality to low quality. Doing so supports myriad real-world use cases in which high-quality video is dominant and adaptation to lower-quality representations is still required. The traditional "bottom-up" structure, which is inherently optimized for low-quality reproductions [5], is inappropriate for these use cases and must therefore be replaced. We propose that scalable bitstreams can be structured to take a "top-down" approach, anchoring the rate-distortion curve at the point of highest quality and introducing coding inefficiency only at lower layers. This is illustrated by the chart labeled "proposed scalability" in FIG. 1. With such an approach, scalability is recharacterized not as a base layer accompanied by a series of enhancements, but instead as a full-quality stream separated into a series of degradations.

As described herein, we propose a novel method for achieving layered scalability using a top-down approach. We treat bitstream scalability abstractly as a symbol-dropping problem in which symbols are selected to be excluded from the coded bitstream based on knowledge about their semantic importance as well as to achieve a predetermined target bit rate. The key insight is that the decision whether each symbol is included in the degraded bitstream is fully replicable by the decoder without signaling any additional information. Thus, the decoder knows every time a symbol is dropped from the bitstream, and has the opportunity to respond accordingly. Furthermore, this symbol-dropping process may be repeated iteratively using the dropped symbols to form a separate coded bitstream, from which symbols may be dropped again. Thus, each bitstream forms a coded layer, and each layer provides resolution of more symbol values than the prior layer. If all layers are decoded together, every symbol is recovered and a full-quality reproduction is produced.

This approach has a number of benefits. First, even decoders interested in low-quality reproductions know every time a symbol is missing from the bitstream. This knowledge can be used to form a prediction about the values of the missing symbols. In particular, this trait synergizes well with entropy coding techniques such as arithmetic coding, which require the decoder to maintain a symbol probability model. The decoder may query the state of the model to receive the most probable symbol(s) and use them to form a prediction about the missing value. Second, the proposed approach is domain-agnostic in terms of the source coding used as well as the type of data being coded. While we present results with video data, it can be used to compress voice, image, text, or any other information. Third, it is naturally structured as a top-down solution since recovering all of the layers results in receiving all of symbols of the original high-quality representation. As each layer is added, encoding efficiency improves. Finally, our approach leverages the fact that the symbol dropping decision is replicated at both the encoder and decoder to achieve scalability while keeping the decoder synchronized without requiring any additional information to be signaled.

We demonstrate the proposed approach as an early proof-of-concept by applying it to an HEVC source bitstream, dropping certain syntax elements from the source into a series of layered bitstreams that can be selectively received and decoded together to produce a degraded reproduction of the video. In particular, we apply our approach to the quantized residual coefficient data arranged into sequences of bins and entropy coded using context-adaptive binary arithmetic coding (CABAC). We selectively drop these residual coefficient bins from the base HEVC stream and include them instead in other layers. This process is described more precisely in Section 4.

The present specification is organized as follows. Section 2 provides a brief description about how modern video codecs, including HEVC, are structured. Section 3 introduces how the proposed approach achieves layered scalability given an abstract input symbol stream. Section 4 describes how the proposed approach might be applied to an HEVC bitstream, and Section 5 discusses the technique's promise for future applications.

2 Data Compression

2.1 High-Level Structure of Video Bitstreams

Traditional (non-scalable) video coding standards, including HEVC, are composed of two independent compression modules: a source modeling unit, which turns raw video frames into a sequence of syntax elements that indicate how the video should be pieced together by the decoder, and an entropy coding unit, which further compresses the syntax elements using informational entropy techniques [12, 16]. The output of these two steps is a bitstream consisting of a sequence of entropy-coded syntax elements.

Modern video coders generally use a prediction-residual structure when performing source modeling. That is, the decoder generates a prediction for the next piece of video data to display, and then receives a transmitted prediction residual from the encoder that contains error correction information which can be used to correct the prediction. Residual information for modern coders is invariably organized as a series of quantized frequency transform coefficients that are produced when the encoder performs a discrete, two-dimensional frequency transform on the pixel-domain prediction error and quantizes the resulting matrix of coefficients.

Video data reconstructed by the decoder can be displayed to the user and may be stored in a decoded picture buffer at the decoder to be used for making future predictions. To remain synchronized, the encoder and decoder must agree about the reconstructed data. This is essential to maintaining the integrity of future predictions. Thus, any error in the decoded reconstruction that is unknown by the encoder will be unaccounted and will be propagated forward to future frames by the prediction unit of the decoder. Error introduced at the decoder, untracked by the encoder, and propagated in this way is called drift because it causes reconstructed values to drift away from the anticipated values as time passes in the video [1, 6, 9, 14, 17].

2.2 Arithmetic Coding

Arithmetic coding is a lossless entropy-based technique for serializing an input symbol stream to a bitstream that supports arbitrarily precise symbol probability models and can obtain theoretically optimal compression. Due to this flexibility, it is a well-known compression technique widely used in modern video coding standards. While the details of arithmetic coding are not crucial for understanding various aspects of the present subject matter, a basic understanding of its probability model management is important and is therefore outlined below.

Every time a symbol from the input stream is about to be processed by an arithmetic codec, a precondition is that the encoder and decoder must share a common symbol probability model. This model estimates, for each possible value of the next symbol, an associated probability representing how likely it is that that value will be the next coded symbol in the stream. The shared probability model is used by the encoder and the decoder to deterministically decide how many bits to spend when signaling each possible value, in a way that high probability values will be signaled with shorter bit patterns and low probability values will be signaled with longer bit patterns. After the true next symbol value is signaled in the bitstream, the encoder and decoder may update the state of the probability model based on the signaled value, since both the encoder and the decoder know what the value was; probability models which adjust in response to prior coded values are called "adaptive." Furthermore, the probability model may also change for the next coded symbol based on a semantic understanding of the meaning behind that next symbol and a corresponding understanding of which symbols are likely given that meaning. Note that adapting in this way requires knowledge about the specific data being coded. Probability models that adjust based on an understanding of the symbol's contextual meaning within the larger stream are generally called "context-adaptive."

3 Layered Symbol Entropy Coding

As outlined in Section 1, we now present a novel characterization of scalable coding as a top-down stream degradation. The proposed scheme takes an arbitrary, source-modeled input sequence of symbols and distributes them into a set of layered output streams based on their anticipated encoding cost as well as their context and importance within the larger stream. As symbols are assigned to a layer, an entropy coder serializes them into the corresponding output bitstream for that layer. Suppose there are n layers in total, numbered from 1 to n. To reconstruct the complete source symbol stream, a decoder must receive all n layered bitstreams. Alternatively, a lower quality reproduction may be recovered at a smaller bit rate by requesting only the bitstreams from layers 1 to k for some k<n. In this case, all symbols coded in layers k+1 to n will be lost, but the symbols in layers 1 to k are recoverable as long as the decoder can interpret them without receiving any symbols from the higher layers. If symbols are approximately evenly distributed among the layers, then changing k effectively controls a scalability trade-off between symbol recovery rate and encoded bit rate.

An underlying assumption is that the decoder is able to determine the correct layer from which each symbol should be decoded, even when not all layers are received (i.e. when k<n). This allows the decoder to correctly decode symbols that are present in the available bitstreams, while also being aware of symbols that are missing due to being signaled in a higher layer. The assumption holds if the decision for which layer to use when coding the next symbol is made based on a deterministic algorithm that is fully replicable by the decoder. We model this algorithm as a series of indicator functions, one at each layer, representing whether the symbol is signaled in that layer's bitstream.

Figure 2:
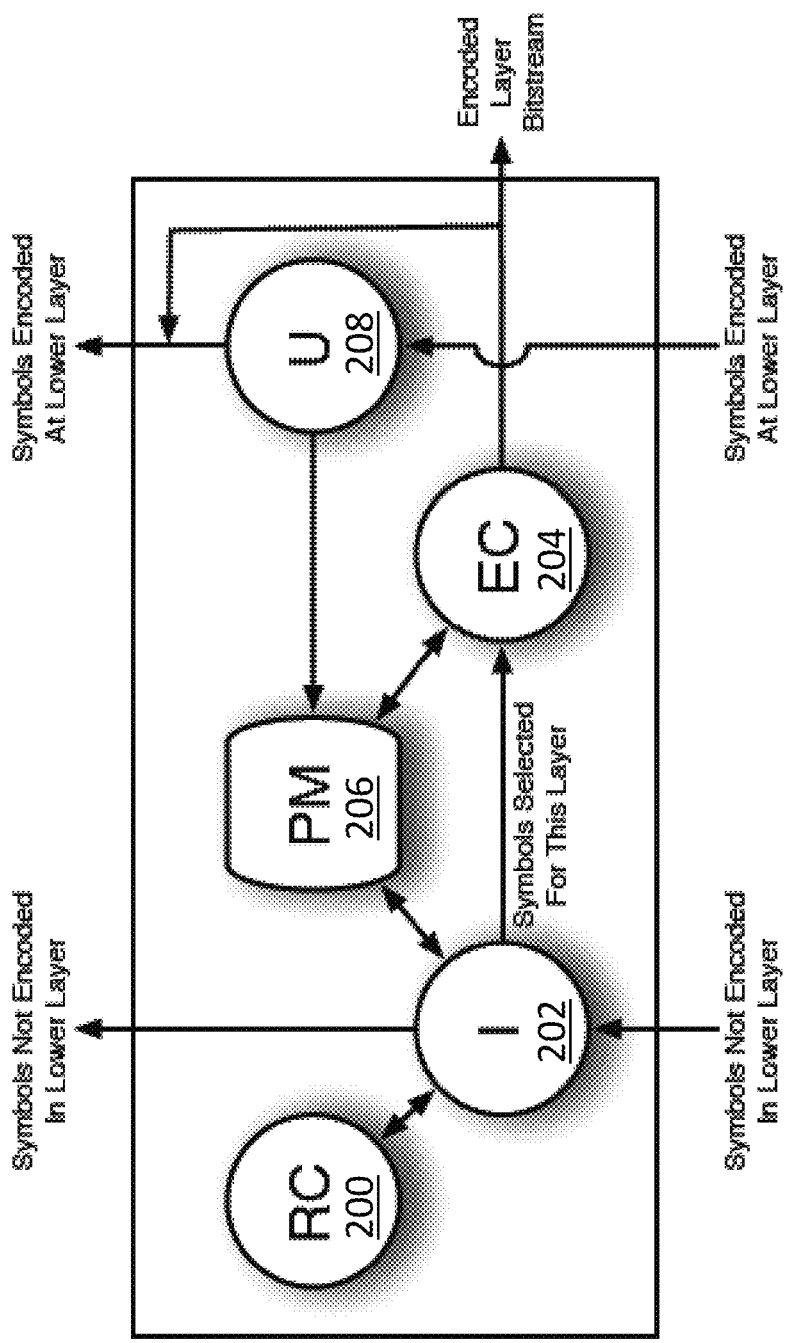
FIG. 2 depicts a block diagram of components associated with a single layer.

FIG. 2 depicts a block diagram of components associated with a single layer. These components include a rate controller (RC) 200, an indicator process (I) 202, an entropy coder (EC) 204, a probability model (PM) 206, and a probability model update process (U) 208. As shown in FIG. 2, two streams of symbols arrive at each layer. One is a stream of symbols not encoded by any lower layer. The other is a stream of symbols encoded at a lower layer. I 202 evaluates whether or not the next unencoded symbol should be selected for this layer. Those not chosen are passed to the next higher layer. Those chosen are passed to EC 204 and emitted as part of this layer as well as added to the stream of symbols already appearing in a lower layer sent to the next higher layer. Symbols encoded as part of lower layers are used by U 208 to update PM 206 as if they were encoded at this layer. This allows the entropy encoding efficiency to improve at each higher layer until it is as efficient as the original representation at the highest layer.

In order for this scheme to be practical, original high-quality representations may be designed so that symbol rate is smoothly related to reproduction quality, and sophisticated indicator functions may be developed that consider symbol semantics (but not actual values) to appropriately sort symbols into each layer in a rate-controlled manner. As described herein, we apply our scheme to a small subset of HEVC syntax elements using an indicator function δ as an early work-in-progress proof of concept.

The indicator function δ is given by:

$$\delta(b, PM) = \begin{cases} 1 & \text{if } b \geq -\log P(LPS(PM)) \\ 0 & \text{otherwise} \end{cases} \quad (1)$$

where LPS extracts the least probable symbol of probability model PM, P calculates the probability of the passed symbol, and δ(b,PM)=1 indicates that the symbol should be encoded in the layer. The value of b is provided by a rate controller and represents the current "bit budget" for this symbol. Essentially this function only allows the symbol to be encoded at this layer if encoding the least probable symbol possible is allowed by the current state of the rate controller.

Finally, note that each layer must manage a separate probability model and bit budget state on both the encoder and the decoder. This introduces memory and complexity overhead during encoding/decoding, as states must be adjusted for every layer each time a symbol is coded. The overall complexity for coding s symbols in k layers is therefore O(sk).

4 Application to Hevc Symbol Streams

Figure 3:
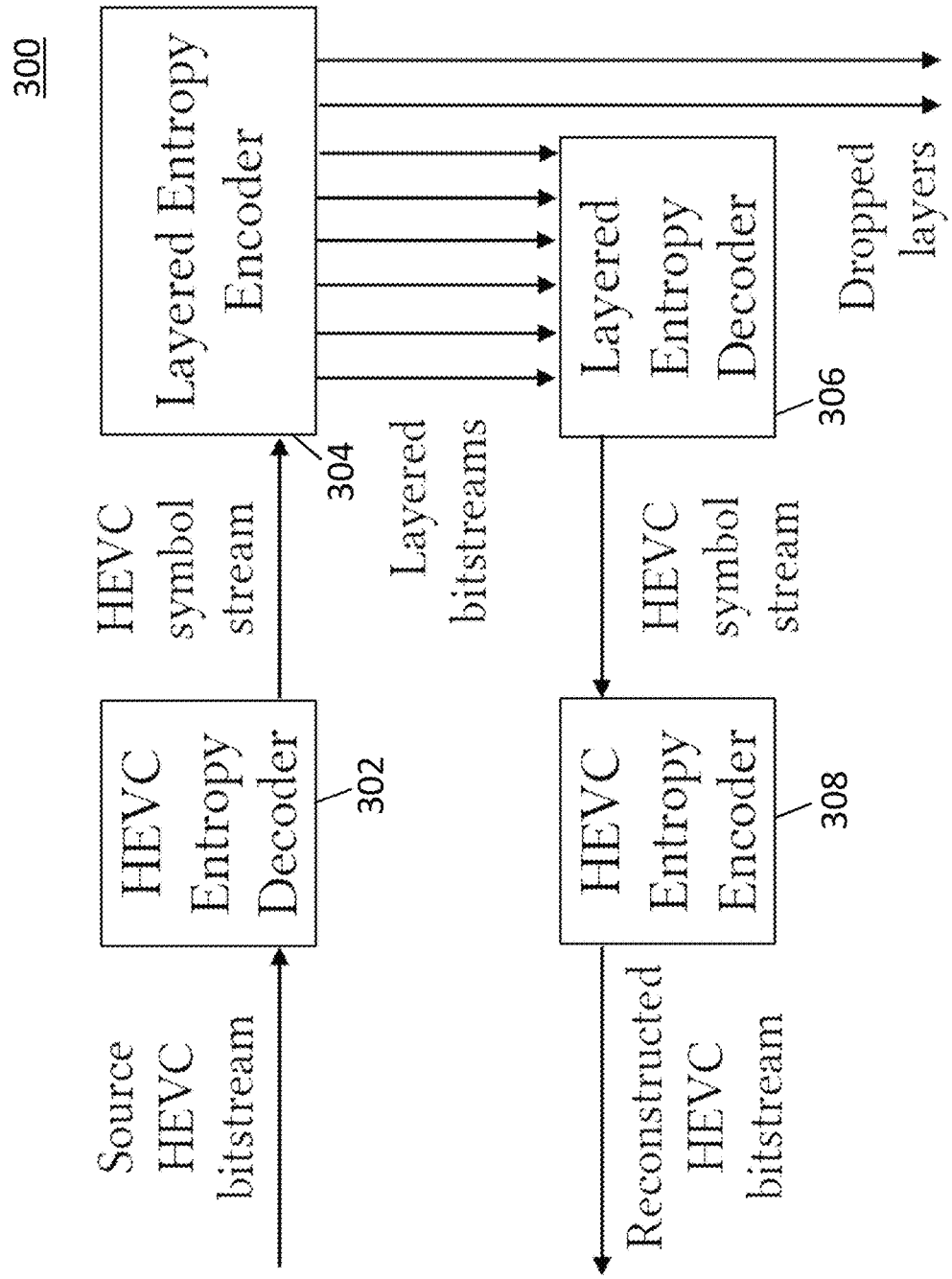
FIG. 3 depicts an example encoding and decoding environment.

To demonstrate the feasibility of layered entropy coding with real data, we apply the technique to a standard-compliant HEVC symbol stream, producing a scalable encoding of video data. As discussed in Section 2, HEVC is organized into a source-modeling portion in which the video is represented as a stream of semantic symbols, and an entropy coding portion where CABAC and variable-length coding (VLC) serialize each symbol into the output bitstream. Our approach is to modify HEVC's CABAC algorithm that output symbols into different layers according to the process described in Section 3. FIG. 3 shows an example encoding and decoding environment 300. As shown in FIG. 3, Environment 300 may include an HEVC entropy decoder 302 and a layered entropy encoder 304 acting as an HEVC transcoder. For example, HEVC entropy decoder 302 may take as input a pre-coded, standard-compliant HEVC bitstream and remove entropy coding to recover a source-modeled symbol stream. In this example, layered entropy encoder 304 may re-apply entropy coding via a modified CABAC algorithm (e.g., as described in Section 3) to produce a series of layered bitstreams. Environment 300 may also include a corresponding modified decoder, such a layered entropy decoder 306. For example, layered entropy decoder 306 may receive one or more of the layered bitstreams (produced by layered entropy encoder 304) and decode those the one or more layered bitstream(s), recovering an approximate symbol stream that can be entropy coded back into a standard-compliant HEVC bitstream by an HEVC entropy encoder 308.

For our proof of concept experiments, we only layer syntax elements representing residual coefficient level data. The value of these elements are independent of other syntax elements and thus can be distributed among layers without having to consider dependency relationships which is beyond our example indicator function [2]. Furthermore, residual coefficient data makes up a large portion of the HEVC bitstream—especially when the encoder is set to output at high quality [11]. Thus, layering residual coefficients is easier to implement while providing enough layerable symbols to produce a meaningful scalable encoding.

HEVC decomposes residual coefficient values into the following series of binary flags for entropy coding: (1) significant_coeff_flag: Signals whether a coefficient is non-zero.

(2) coeff_abs_level_greater1_flag: Signals whether a known nonzero coefficient is greater than one.
(3) coeff_abs_level_greater2_flag: Signals whether a coefficient known to be greater than one is greater than two.
(4) coeff_sign_flag: Signals a coefficient's sign using equiprobable bins.
(5) coeff_abs_level_remaining: Signals a coefficient's remaining uncoded level using Exp-Golomb coding with an adaptive Rice parameter.

Two different coefficient layering schemes are implemented and tested. In the first scheme, only bits used to code coeff_abs_level_remaining are allowed to be placed in higher layers. In the second, all of the following elements are layered:

significant_coeff_flag
coeff_abs_level_greater1_flag
coeff_abs_level_greater2_flag
coeff_abs_level_remaining In the first scheme, the rate controller allots 0.25 additional bits to each layer each time a coeff_abs_level_remaining value is signaled; unused allotted bits from the previous coefficient are rolled forward. Next, the bits for coding the flag via Exp-Golomb are separated and encoded one at a time into the layered bitstreams, starting at the bottom layer and encoding upward. Due to the structure of Exp-Golomb codes, the decoder is able to follow this process by using the bit values decoded from one layer to know if more should be expected in the next.

For the second scheme, all encoded individual coefficient level flags are layered. This has the added benefit of stratifying more bits into layers than the first scheme. However, it requires additional memory and complexity at both the encoder and decoder, particularly since each layer must track separate probability models for significance flags, greater than one flags, and greater than two flags. The rate controller allots 0.25 additional bits to each layer for each explicitly coded coefficient. This single allotment is used to code all required flags for that coefficient. If coeff_abs_level_remaining must be signaled, the same process as the first scheme is used.

One concern when omitting residual data from a pre-encoded HEVC bitstream is that any error incurred by dropping symbols at the decoder may not be accounted for in the picture buffer at encoding time and that this error may induce drift in the reconstructed pixel samples that can potentially be fed forward to future frames. To reduce drift, we restrict layering only to coefficient levels in inter-coded blocks, with the underlying assumption that intra-predicted blocks are more likely to be used by prediction units to code future frames. Note that this is an inelegant attempt at reducing drift. We expect that more sophisticated techniques may better anticipate which coefficients are likely to be used for future prediction, and that they would achieve better results. However, it provides a valuable baseline of the feasibility of the proposed approach.

To test the scheme, ten seconds of the 1080p, 25 fps video sequence Tractor is encoded using the open-source libx265 HEVC encoder [7] with a constant quality parameter (QP) of 17, set to produce exactly one intra-predicted frame followed by a series of P frames. These encoding parameters are chosen to emulate a situation where a video is captured at high quality with hardware-level encoding complexity. The resulting HEVC encoding is used as the source bitstream for the two layered encoding schemes presented as described herein.

5 Results and Discussion

Figure 4:
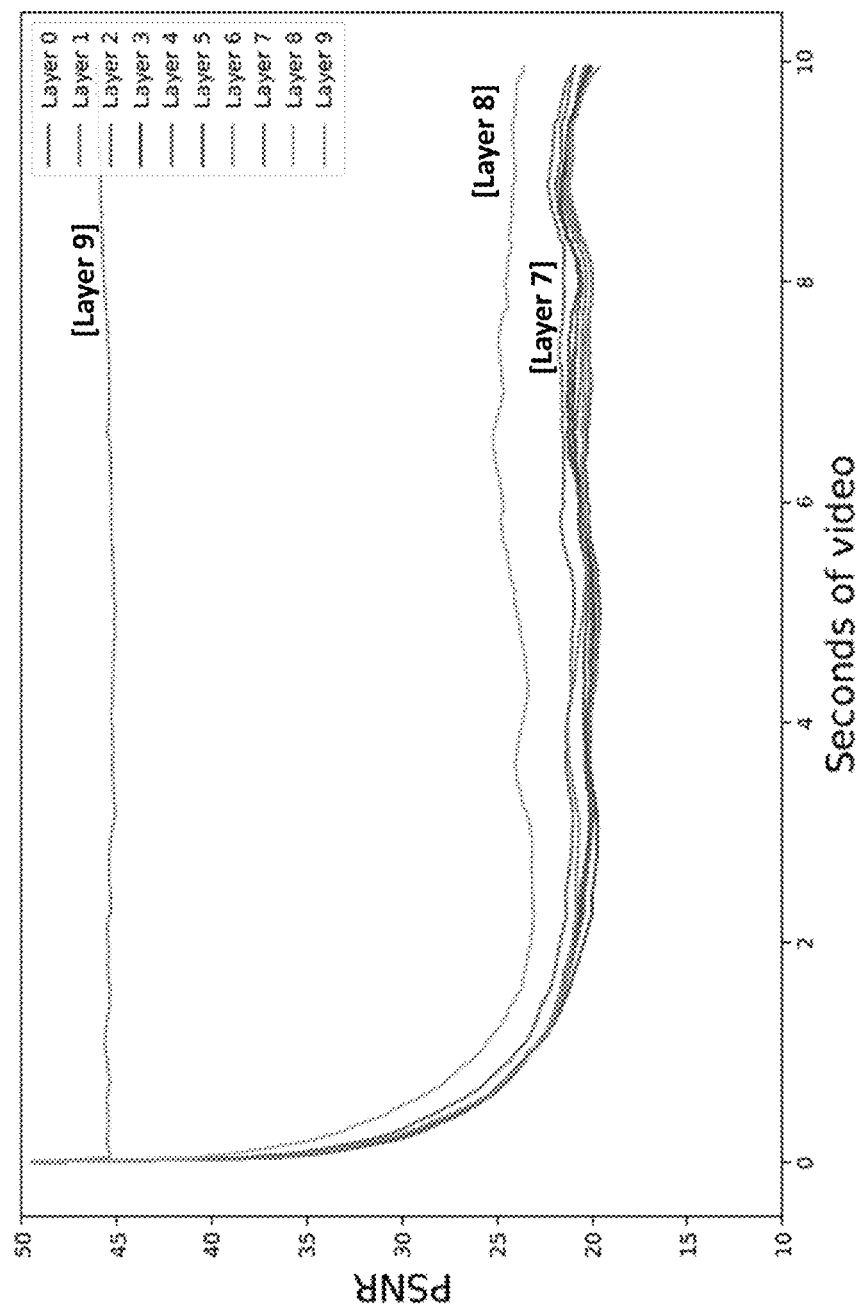
FIG. 4 depicts peak signal to noise ratio (PSNR) of frames over time when only remaining level coefficient bits are layered.
Figure 5:
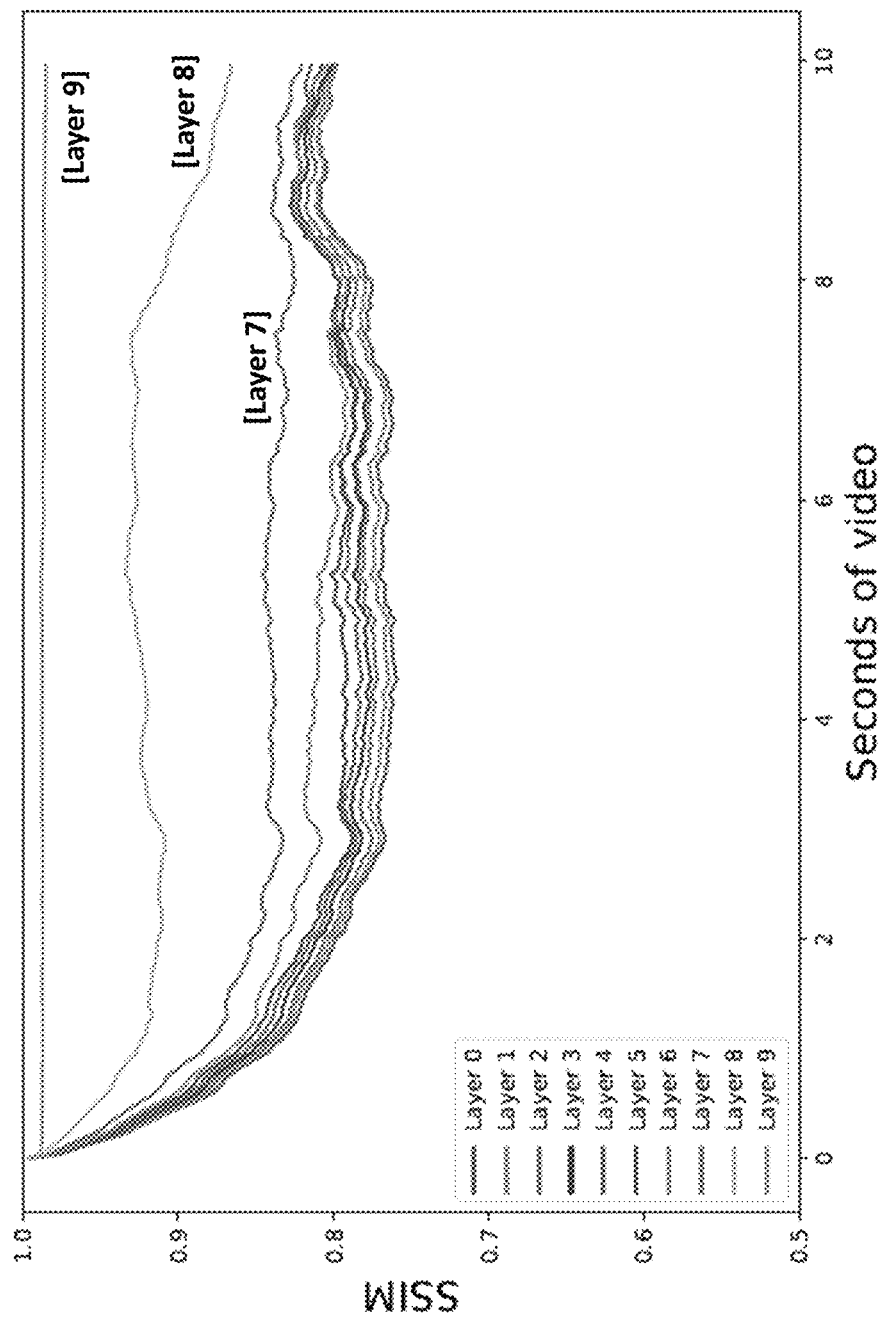
FIG. 5 depicts structural similarity index (SSIM) of frames over time when only remaining level coefficient bits are layered.
Figure 6:
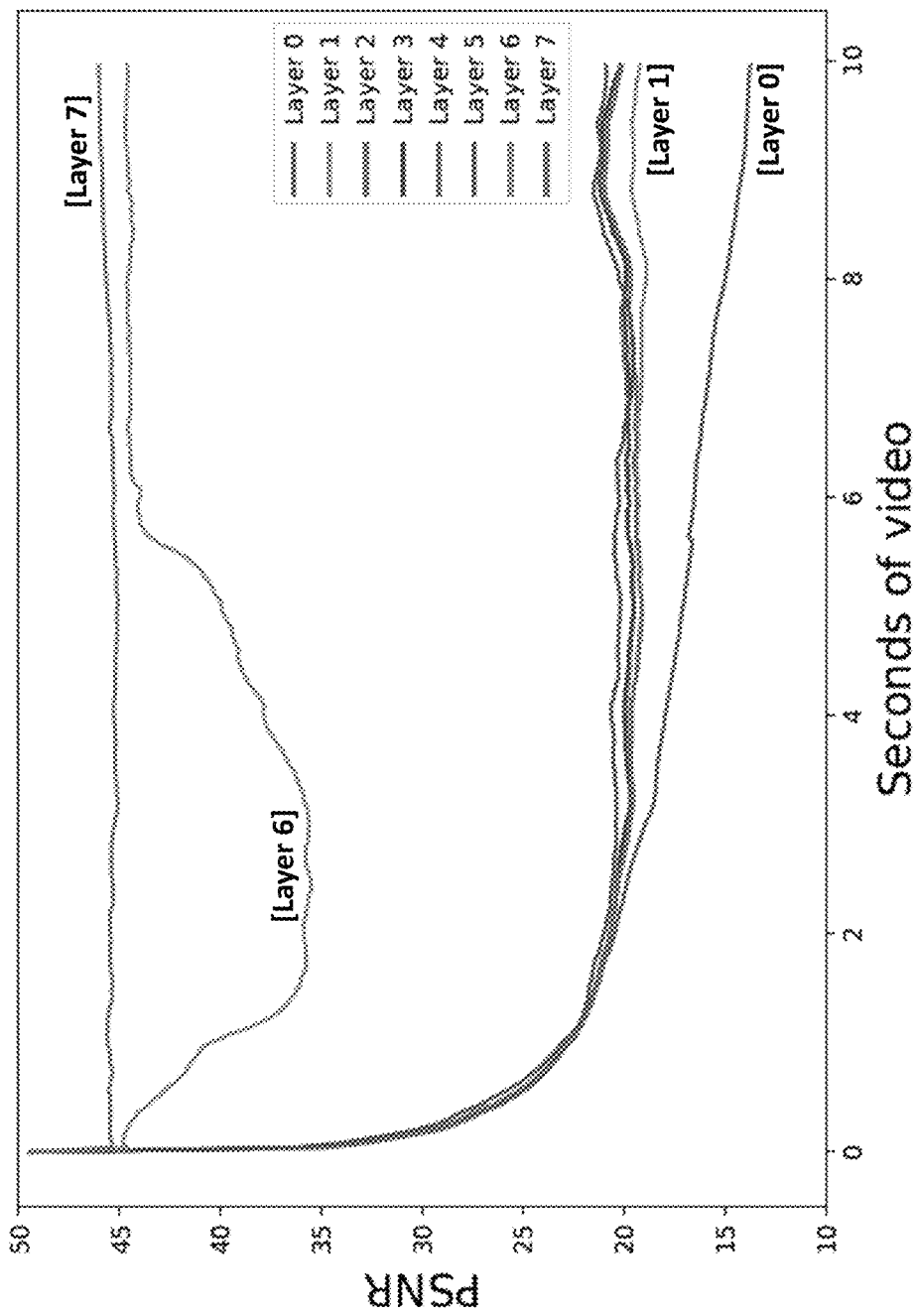
FIG. 6 depicts PSNR of frames over time when all coefficient flags are layered.
Figure 7:
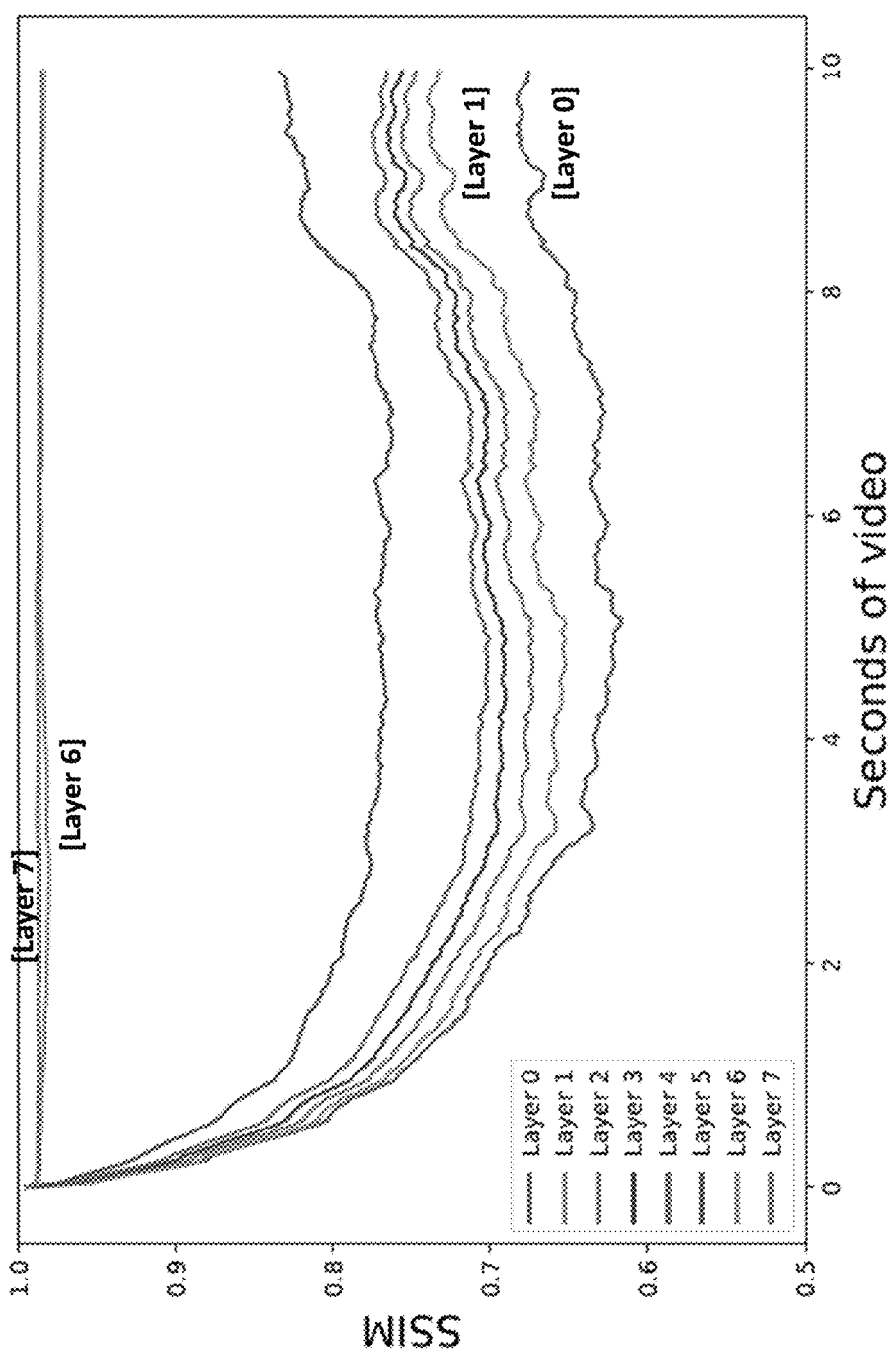
FIG. 7 depicts SSIM of frames over time when all coefficient flags are layered.
Figure 8:
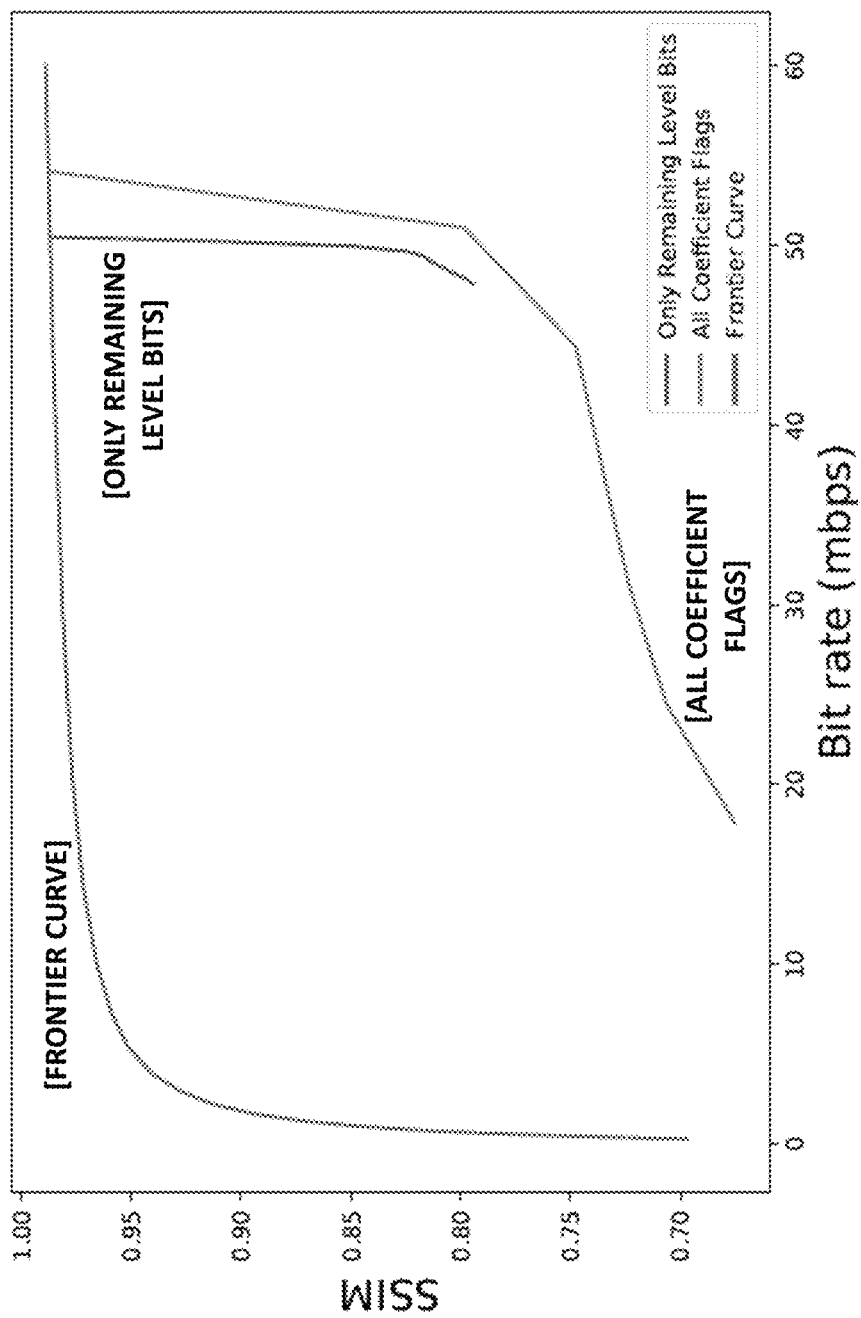
FIG. 8 depicts a rate-distortion curve showing our two proposed coefficient-dropping techniques in comparison to the frontier using SSIM as the quality metric.
Figure 9:
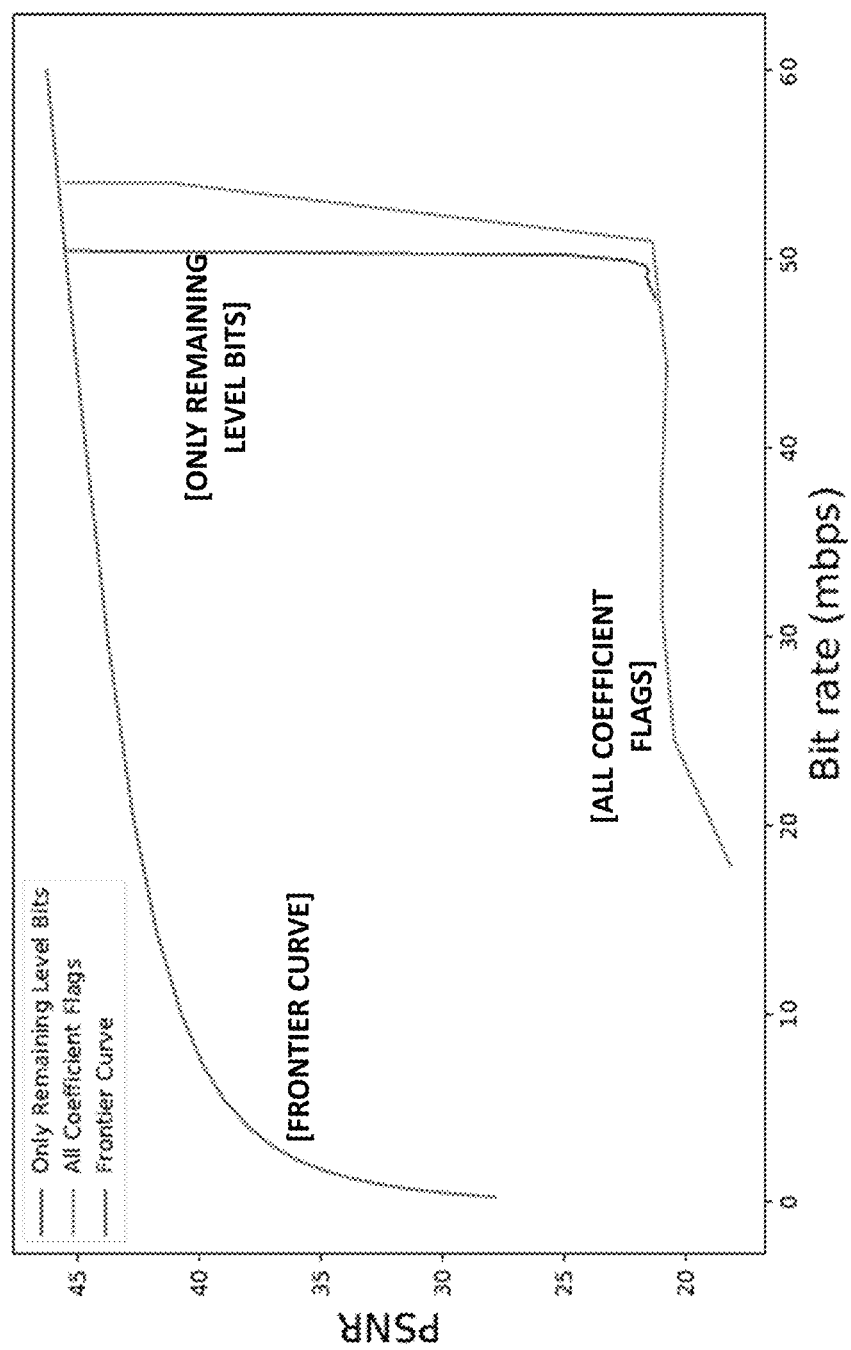
FIG. 9 depicts a rate-distortion curve showing our two proposed coefficient-dropping techniques in comparison to the frontier using PSNR as the quality metric.

FIGS. 4-9 depict various information, e.g., results and/or metrics, associated with one or more approaches described herein. FIG. 4 depicts peak signal to noise ratio (PSNR) of frames over time when only remaining level coefficient bits are layered. FIG. 5 depicts structural similarity index (SSIM) of frames over time when only remaining level coefficient bits are layered. FIG. 6 depicts PSNR of frames over time when all coefficient flags are layered. FIG. 7 depicts SSIM of frames over time when all coefficient flags are layered. FIG. 8 depicts a rate-distortion curve showing our two proposed coefficient-dropping techniques in comparison to the frontier using SSIM as the quality metric. FIG. 9 depicts a rate-distortion curve showing our two proposed coefficient-dropping techniques in comparison to the frontier using PSNR as the quality metric.

FIGS. 8 and 9 demonstrate that neither of the two tested techniques were able to achieve a trade-off between quality and bit rate such that increases in rate yield corresponding increases in quality. Scores associated with SSIM were slightly better than PSNR, indicating that even as coefficient data is dropped, some structural information is still recoverable through the prediction and other retained elements. Moreover, the proposed technique did not yield enough layerable bits to reach the low end of the bit rate scale. Future attempts at layering HEVC data may find additional syntax elements that can be removed from the bitstream without affecting decodability.

A significant antagonist of both techniques is the drift caused by decoded error being fed forward by the decoder to future frames. FIGS. 4, 5, 6, and 7 illustrate how quickly drift takes its toll; within the first two seconds of video (roughly 50 frames), all layered streams have degraded to a near-steady state in terms of reproduction quality. Interestingly, both SSIM and PSNR demonstrate a phenomenon where quality increases slightly after a few seconds of video. This may be an indication that the probability models at lower layers require a longer period of time before they are able to adapt to the statistics of the scene and accept more flags to be encoded.

The results show promising signs that the same or similar ideas might perform better with a more sophisticated approach. First, the rate-distortion curves for both proposed layering schemes are, as desired, anchored at the top of the frontier curve. This was a motivating concept behind the proposed scheme. Overall, the results validate that an top-down approach can be applied to HEVC. Additionally, the equally-spaced layers shown in FIG. 7 indicate that it may be possible to better control coefficient removal and achieve a more gradual degradation in quality.

Also, the results suggest some areas in which the scheme may be improved. First, the layered residual coefficients can be coded more carefully to reduce the chance that an important coefficient was deferred to a higher layer. Better results may be achieved by identifying these coefficients and coding them in lower layers. Second, future proposed schemes may attempt to apply layering to a larger set of syntax elements. Third, the rate controller process may be modified or designed to account for drift or symbol importance in addition to tracking bit rate. And finally, techniques and approaches for eliminating the effect of drift may be implemented and/or improved. For example, eliminating the effect of drift may be achieved by closing the prediction loop at the encoder for every layer produced, though such an approach may make encoder complexity a concern [4]. However, a radically different approach may involve adjusting the input video's symbol stream structure to prevent long-term prediction feedback loops within the existing coding blocks, e.g., by periodically signaling small portions of the video without using prediction such that eventually the decoder's entire picture is refreshed.

The subject matter described herein demonstrates a baseline approach towards entropy-driven, top-down scalable video coding. Further, the subject matter described herein demonstrates that a top-down interpretation of video coding is not only possible, but it is a fundamentally more representative interpretation of modern video usage behavior. We believe that entropy-driven, top-down scalable video coding approaches as described herein are important because they represent a seminal point in the right direction for the future of scalability and have the potential to spur this change.

Figure 10:
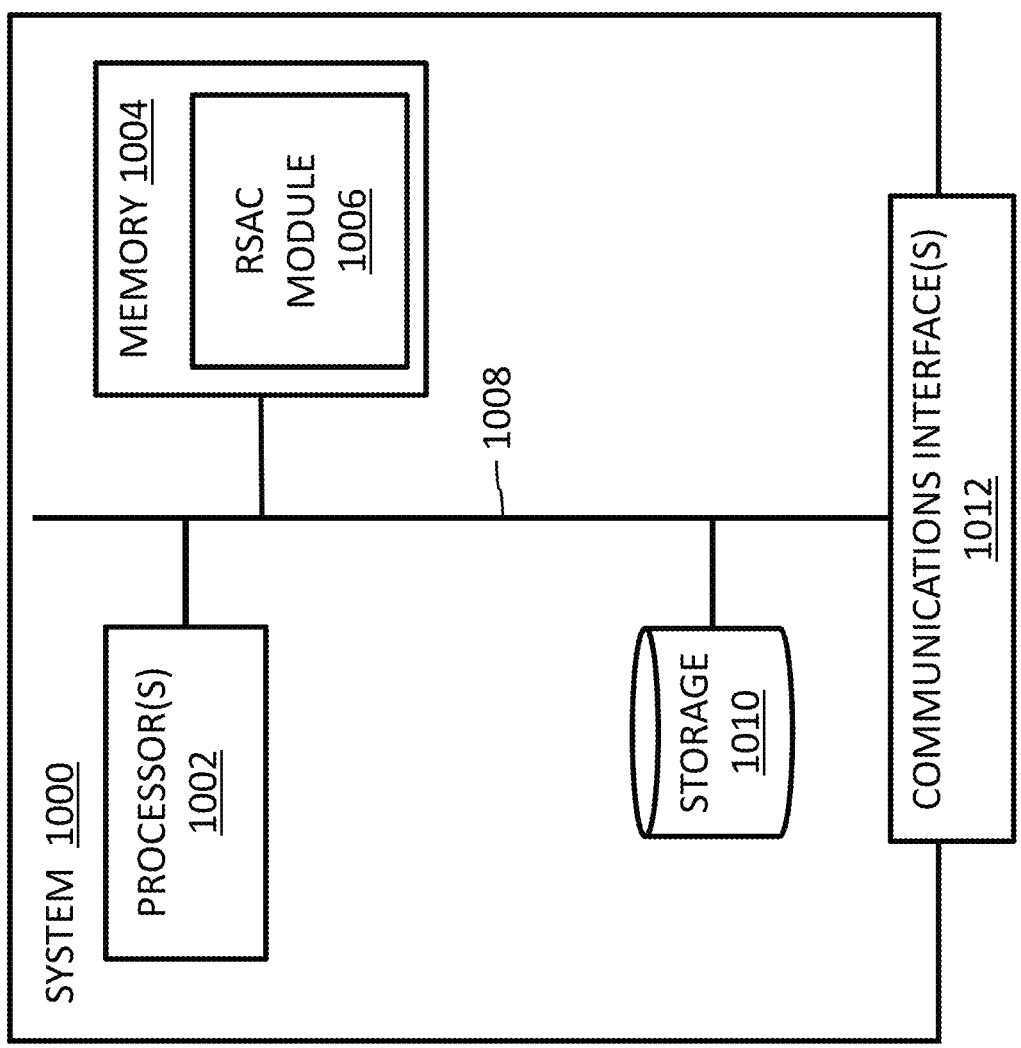
FIG. 10 is a diagram illustrating an example computer system for rate sorted entropy coding.

FIG. 10 is a diagram illustrating an example computer system 1000 for rate sorted entropy coding. In some embodiments, computer system 1000 may be a single device or node or may be distributed across multiple devices or nodes.

Referring to FIG. 10, computer system 1000 includes one or more processor(s) 1002, a memory 1004, and storage 1010 communicatively connected via a system bus 1008. Computer system 1000 may include or utilize one or more communications interface(s) 1012. In some embodiments, processor(s) 1002 can include a microprocessor, a central processing unit (CPU), a graphics processing unit (GPU), and/or any other like hardware based processing unit. In some embodiments, a RSAC module 1006 can be stored in memory 1004, which can include random access memory (RAM), read only memory (ROM), optical read/write memory, cache memory, magnetic read/write memory, flash memory, or any other non-transitory computer readable medium.

RSAC module 1006 may include logic and/or software for performing various functions and/or operations described herein. In some embodiments, RSAC module 1006 may include or utilize processor(s) 1002 or other hardware to execute software and/or logic. For example, RSAC module 1006 may perform various functions and/or operations associated with performing video compression, data compression, data encoding (e.g., video and/or audio encoding), data decoding (e.g., video and/or audio decoding), and/or arithmetic coding.

In some embodiments, computer system 1000 may include one or more communications interface(s) 1012 for communicating with nodes, modules, and/or other entities. For example, one or more communications interface(s) 112 may be used for communications between RSAC module 1006 and a system operator and a same or different communications interface for communicating with other modules or network nodes.

In some embodiments, processor(s) 1002 and memory 1004 can be used to execute RSAC module 1006. In some embodiments, storage 1010 can include any storage medium, storage device, or storage unit that is configured to store data accessible by processor(s) 1002 via system bus 1008. In some embodiments, storage 1010 can include one or more databases hosted by or accessible by computer system 1000.

In some embodiments, RSAC module 1006 may perform a method and/or technique for achieving layered scalability using a top-down approach. For example, RSAC module 1006 may utilize a deterministic algorithm and a symbol probability model in which symbols are selected to be excluded from a coded bitstream based on knowledge about their semantic importance as well as to achieve a predetermined target bit rate. In this example, the decision regarding whether each symbol is included in the degraded bitstream is fully replicable by the decoder without signaling any additional information. Thus, the decoder knows every time a symbol is dropped from the bitstream, and has the opportunity to respond accordingly. Furthermore, this symbol-dropping process may be repeated iteratively using the dropped symbols to form a separate coded bitstream, from which symbols may be dropped again. Thus, each bitstream forms a coded layer, and each layer provides resolution of more symbol values than the prior layer. If all layers are decoded together, every symbol is recovered and a full-quality reproduction is produced.

In some embodiments, a video encoder (e.g., implemented using or by RSAC module 1006) may perform data encoding using rate sorted entropy coding or a related aspect thereof. For example, RSAC module 1006 may receive a first symbol associated with a symbol stream; determine, using a symbol probability model and a deterministic algorithm, that the first symbol is to be encoded in a first bitstream (e.g., layer), wherein the first bitstream is associated with a first bitrate; and encode, using arithmetic coding, the first symbol into the first bitstream as a first encoded bit representation of the first symbol.

In some embodiments, a video decoder (e.g., implemented using or by RSAC module 1006) may perform data decoding using rate sorted entropy coding or a related aspect thereof. For example, RSAC module 1006 may receive rate control information associated with a first bitstream; may determine, using the rate control information, a maximum amount of bits available for a next symbol in the first bitstream; may determine, using a symbol probability model shared by the video decoder and a corresponding video encoder and a deterministic algorithm, an amount of bits for a least probable value of the next symbol; and may determine that the next symbol is included in the first bitstream if the amount of bits for the least probable value of the next symbol is less than or equal to the maximum amount of bits available for the first bitstream and may determine that the next symbol is not included in the first bitstream if the amount of bits for the least probable value of the next symbol is greater than the maximum amount of bits available for the first bitstream.

It will be appreciated that FIG. 10 is for illustrative purposes and that various nodes, their locations, and/or their functions may be changed, altered, added, or removed. For example, some nodes and/or functions may be combined into a single entity or some functionality (e.g., in RSAC module 1006) may be separated into separate nodes or modules.

Figure 11:
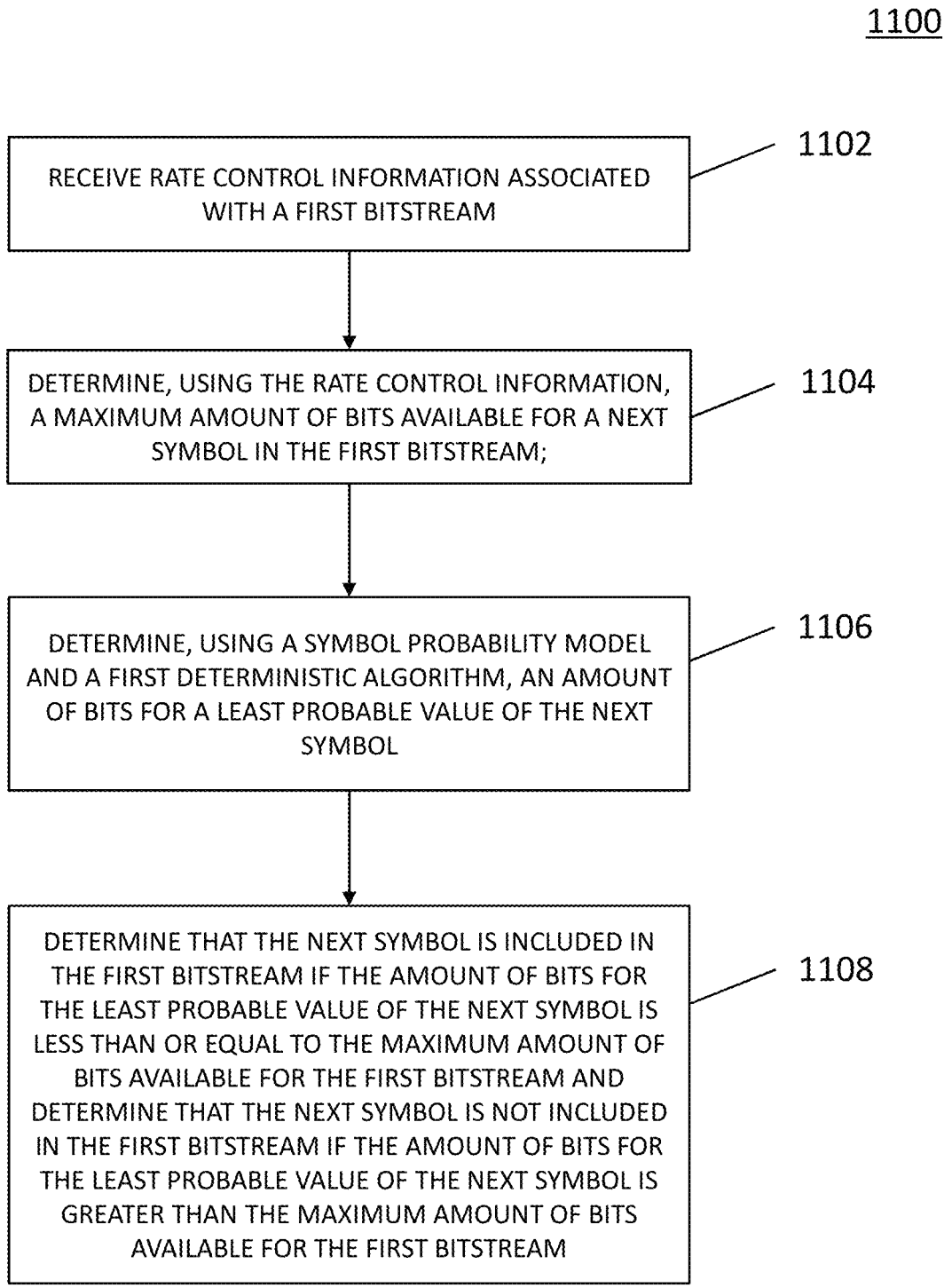
FIG. 11 is a diagram illustrating an example process for decoding video data using rate sorted entropy coding.

FIG. 11 is a diagram illustrating an example process 1100 for decoding video data using rate sorted entropy coding. In some embodiments, process 1100 described herein, or portions thereof, may be performed at or by system 1000, RSAC module 1006, processor(s) 1002, a video decoder, and/or a module or node. For example, RSAC module 1006 or system 1000 may include or be a mobile device, a smartphone, a tablet computer, a computer, or other equipment. In another example, RSAC module 1006 may include or provide an application running or executing processor(s) 1002.

In some embodiments, process 1100 may include steps 1102-1108 and may be performed by or at one or more devices or modules, e.g., a video decoder implemented using at least one processor.

In step 1102, rate control information associated with a first bitstream may be received.

In step 1104, a maximum amount of bits available for a next symbol in the first bitstream may be determined using the rate control information.

In step 1106, an amount of bits for a least probable value of the next symbol may be determined using a symbol probability model and a first deterministic algorithm.

In step 1108, it may be determined that the next symbol is included in the first bitstream if the amount of bits for the least probable value of the next symbol is less than or equal to the maximum amount of bits available for the first bitstream and it may be determined that the next symbol is not included in the first bitstream if the amount of bits for the least probable value of the next symbol is greater than the maximum amount of bits available for the first bitstream.

In some embodiments, a symbol probability model and a deterministic algorithm may be used by a video decoder to discern that a second bitstream is associated with a next symbol at run-time (e.g., instead of symbol locations being predetermined or known to an encoder and/or decoder prior to run-time).

In some embodiments, a same symbol probability model may be used by an encoder and a decoder.

In some embodiments, a same deterministic algorithm may be used by an encoder and a decoder. For example, a video encoder and a corresponding video decoded may use a same implementation of a deterministic algorithm.

In some embodiments, an encoder and a decoder may use different deterministic algorithms. For example, a first deterministic algorithm and a second deterministic algorithm may be configured so that a symbol dropping decision for a particular symbol at both the encoder and decoder is the same. In another example, a first deterministic algorithm and a second deterministic algorithm may be configured to determine the same answer regarding the amount of bits required to encode a particular symbol in a bitstream.

In some embodiments, a symbol probability model may be context-aware and adaptive based on previously processed symbols.

In some embodiments, a deterministic algorithm may determine appropriate bitstreams (e.g., layers) for symbols using a symbol probability model.

In some embodiments, a deterministic algorithm may use an available bit value associated with a first bitstream and a potential bit value associated with a first symbol based on a symbol probability model to determine whether the first symbol is to be encoded in the first bitstream (e.g., a base layer). In such embodiments, if the first symbol is not to be encoded in the first bitstream, the deterministic algorithm may use a similar approach for determining whether the first symbol is to be encoded in a second bitstream (e.g., an enhancement layer).

In some embodiments, an available bit value associated with a first bitstream may be provided by a rate controller that controls the bitrate of the first bitstream. In some embodiments, each layer or bitstream associated with a data source or destination may be controlled the same rate controller or may use different rate controllers.

In some embodiments, a first bitstream is a base layer and a second bitstream is an enhancement layer, wherein the second bitstream includes encoded symbols that are not in the first bitstream. In such embodiments, symbols encoded in the first bitstream may be determined so as to reduce drift effects.

It will be appreciated that process 1100 is for illustrative purposes and that different and/or additional actions may be used. It will also be appreciated that various actions described herein may occur in a different order or sequence.

It should be noted that system 1000, RSAC module 1006, layered entropy encoder 304, layered entropy decoder 306, and/or functionality described herein may constitute a special purpose computing device. Further, system 1000, RSAC module 1006, layered entropy encoder 304, layered entropy decoder 306, and/or functionality described herein can improve the technological field of codecs and/or network communications, by providing mechanisms for rate sorted entropy coding and/or using common or shared symbol probability models at encoders and decoders. As such, various techniques and/or mechanisms described herein can implement video compression schemes that rely on arithmetic encoding without having to fully decode and re-encode (i.e., transcode) the original stream making it a computationally efficient manner for adapting a high quality, high bandwidth video stream into a lower quality, lower bandwidth stream.

The disclosure of each of the following references is incorporated herein by reference in its entirety to the extent not inconsistent herewith and to the extent that it supplements, explains, provides a background for, or teaches methods, techniques, and/or systems employed herein.

REFERENCES

[1] Peter Amon, Haoyu Li, Andreas Flutter, Daniele Renzi, and Stefano Battista. 2008. Scalable video coding and transcoding. In 2008 *IEEE International Conference on Automation, Quality and Testing, Robotics*, Vol. 1. IEEE, 336-341.

[2] Shmuel Benyaminovich, Ofer Hadar, and Evgeny Kaminsky. 2005. Optimal transrating via dct coefficients modification and dropping. In *ITRE* 2005. 3*rd International Conference on Information Technology: Research and Education,* 2005. IEEE, 100-104.

[3] Jill M Boyce, Yan Ye, Jianle Chen, and Adarsh K Ramasubramonian. 2016. Overview of SHVC: Scalable extensions of the high efficiency video coding standard. *IEEE Transactions on Circuits and Systems for Video Technology* 26, 1 (2016), 20-34.

[4] Johan De Praeter, Glenn Van Wallendael, Jurgen Slowack, and Peter Lambert. 2017. Video encoder architecture for low-delay live-streaming events. *IEEE Transactions on Multimedia* 19, 10 (2017), 2252-2266.

[5] Weiping Li. 2001. Overview of fine granularity scalability in MPEG-4 video standard. *IEEE Transactions on Circuits and Systems for Video Technology* 11, 3 (2001), 301-317.

[6] Claudia Mayer, Holger Crysandt, and Jens-Rainer Ohm. 2002. Bit plane quantization for scalable video coding. In *Visual Communications and Image Processing* 2002, Vol. 4671. International Society for Optics and Photonics, 1142-1153.

[7] MulticoreWare. 2019. x265. http://x265.org/

[8] J-R Ohm. 2005. Advances in scalable video coding. *Proc. IEEE* 93, 1 (2005), 42-56.

[9] Kenneth Rose and Shankar L Regunathan. 2001. Toward optimality in scalable predictive coding. *IEEE Transactions on Image Processing* 10, 7 (2001), 965-976.

[10] Heiko Schwarz, Detlev Marpe, and Thomas Wiegand. 2007. Overview of the scalable video coding extension of the H. 264/AVC standard. To appear in *IEEE Transactions on Circuits and Systems for Video Technology* (2007), 1.

[11] Joel Sole, Rajan Joshi, Nguyen, Tianying Ji, Marta Karczewicz, Gordon Clare, Félix Henry, and Alberto Duenas. 2012. Transform coefficient coding in HEVC. *IEEE Transactions on Circuits and Systems for Video Technology* 22, 12 (2012), 1765-1777.

[12] Gary J Sullivan, Jens-Rainer Ohm, Woo-Jin Han, and Thomas Wiegand. 2012. Overview of the high efficiency video coding (HEVC) standard. *IEEE Transactions on Circuits and Systems for Video Technology* 22, 12 (2012), 1649-1668.

[13] Mihaela Van Der Schaar and Hayder Radha. 2001. A hybrid temporal-SNR fine-granular scalability for internet video. *IEEE Transactions on Circuits and Systems for Video Technology* 11, 3 (2001), 318-331.

[14] Mihaela Van Der Schaar and Hayder Radha. 2002. Adaptive motion-compensation fine-granular-scalability (AMC-FGS) for wireless video. *IEEE Transactions on Circuits and Systems for Video Technology* 12, 6 (2002), 360-371.

[15] Chou-Chen Wang, Yuan-Shing Chang, and Ke-Nung Huang. 2016. Efficient Coding Tree Unit (CTU) Decision Method for Scalable High-Efficiency Video Coding (SHVC) Encoder. In *Recent Advances in Image and Video Coding*. IntechOpen.

[16] Thomas Wiegand, Gary J Sullivan, Gisle Bjontegaard, and Ajay Luthra. 2003. Overview of the H. 264/AVC video coding standard. *IEEE Transactions on circuits and systems for video technology* 13, 7 (2003), 560-576.

[17] Feng Wu, Shipeng Li, and Ya-Qin Zhang. 2001. A framework for efficient progressive fine granularity scalable video coding. *IEEE Transactions on Circuits and Systems for Video Technology* 11, 3 (2001), 332-344.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for decoding video data using rate sorted entropy coding, the method comprising:
   at a video decoder implemented using at least one processor:
   receiving rate control information associated with a first bitstream;
   determining, using the rate control information, a maximum amount of bits available for a next symbol in the first bitstream;
   determining, using a symbol probability model and a first deterministic algorithm, an amount of bits for a least probable value of the next symbol; and
   determining that the next symbol is included in the first bitstream if the amount of bits for the least probable value of the next symbol is less than or equal to the maximum amount of bits available for the first bitstream and determining that the next symbol is not included in the first bitstream if the amount of bits for the least probable value of the next symbol is greater than the maximum amount of bits available for the first bitstream.

2. The method of claim 1 wherein the symbol probability model and the first deterministic algorithm are used by the video decoder to discern that a second bitstream is associated with the next symbol at run-time.

3. The method of claim 1 wherein the first deterministic algorithm determines bitstreams for symbols using the symbol probability model.

4. The method of claim 1 comprising:
   at a video encoder and prior to the video decoder receiving the first bitstream:
   receiving a first symbol associated with a symbol stream;
   determining, using the symbol probability model and a second deterministic algorithm, that the first symbol is to be encoded in the first bitstream, wherein the first bitstream is associated with a first bitrate; and
   encoding, using entropy coding, the first symbol into the first bitstream as a first encoded bit representation of the first symbol.

5. The method of claim 4 wherein the second deterministic algorithm uses an available bit value based on the first bitrate of the first bitstream and a potential bit value associated with the first symbol based on the symbol probability model to determine whether the first symbol is to be encoded in the first bitstream, wherein the second deterministic algorithm is the same as the first deterministic algorithm or wherein the first deterministic algorithm and the second deterministic algorithm are configured to determine a same number of bits required to encode a same symbol.

6. The method of claim 5 wherein the available bit value based on the first bitrate of the first bitstream is provided by a rate controller that controls the first bitrate of the first bitstream.

7. The method of claim 1 wherein the symbol probability model is context-aware and adaptive based on previously processed symbols.

8. The method of claim 7 wherein the symbol probability model and the first deterministic algorithm is configured to minimize drift effects.

9. The method of claim 2 wherein the first bitstream is a base layer and the second bitstream is an enhancement layer, wherein the second bitstream includes encoded symbols that are not in the first bitstream.

10. A system for decoding data using rate sorted entropy coding, the system comprising:
   at least one processor; and
   a video decoder implemented using the at least one processor, wherein the video decoder is configured for:
   receiving rate control information associated with a first bitstream;

determining, using the rate control information, a maximum amount of bits available for a next symbol in the first bitstream;

determining, using a symbol probability model and a first deterministic algorithm shared by the video decoder and a corresponding video encoder, an amount of bits for a least probable value of the next symbol; and determining that the next symbol is included in the first bitstream if the amount of bits for the least probable value of the next symbol is less than or equal to the maximum amount of bits available for the first bitstream and determining that the next symbol is not included in the first bitstream if the amount of bits for the least probable value of the next symbol is greater than the maximum amount of bits available for the first bitstream.

11. The system of claim 10 wherein the symbol probability model and the first deterministic algorithm are used by the video decoder to discern that a second bitstream is associated with the next symbol at run-time.

12. The system of claim 10 wherein the first deterministic algorithm determines bitstreams for symbols using the symbol probability model.

13. The system of claim 10 comprising:
a video encoder configured for:
prior to the video decoder receiving the first bitstream:
receiving a first symbol associated with a symbol stream;
determining, using the symbol probability model and a second deterministic algorithm, that the first symbol is to be encoded in the first bitstream, wherein the first bitstream is associated with a first bitrate; and
encoding, using entropy coding, the first symbol into the first bitstream as a first encoded bit representation of the first symbol.

14. The system of claim 13 wherein the second deterministic algorithm uses an available bit value based on the first bitrate of the first bitstream and a potential bit value associated with the first symbol based on the symbol probability model to determine whether the first symbol is to be encoded in the first bitstream, wherein the second deterministic algorithm is the same as the first deterministic algorithm or wherein the first deterministic algorithm and the second deterministic algorithm are configured to determine a same number of bits required to encode a same symbol.

15. The system of claim 14 wherein the available bit value based on the first bitrate of the first bitstream is provided by a rate controller that controls the first bitrate of the first bitstream.

16. The system of claim 10 wherein the symbol probability model is context-aware and adaptive based on previously processed symbols.

17. The system of claim 16 wherein the symbol probability model and the first deterministic algorithm is configured to minimize drift effects.

18. The system of claim 11 wherein the first bitstream is a base layer and the second bitstream is an enhancement layer, wherein the second bitstream includes encoded symbols that are not in the first bitstream.

19. A non-transitory computer readable medium having stored thereon executable instructions that when executed by a processor of a computer cause the computer to perform steps comprising:
at a video decoder implemented using at least one processor:
receiving rate control information associated with a first bitstream;
determining, using the rate control information, a maximum amount of bits available for a next symbol in the first bitstream;
determining, using a symbol probability model and a first deterministic algorithm, an amount of bits for a least probable value of the next symbol; and
determining that the next symbol is included in the first bitstream if the amount of bits for the least probable value of the next symbol is less than or equal to the maximum amount of bits available for the first bitstream and determining that the next symbol is not included in the first bitstream if the amount of bits for the least probable value of the next symbol is greater than the maximum amount of bits available for the first bitstream.

20. The non-transitory computer readable medium of claim 19 wherein the symbol probability model and the first deterministic algorithm are used by the video decoder to discern that a second bitstream is associated with the next symbol at run-time.

* * * * *